United States Patent Office 3,347,881
Patented Oct. 17, 1967

3,347,881
6α,16α-DIALKYL STEROIDS AND
INTERMEDIATES
Meyer Sletzinger and Donald F. Reinhold, North Plainfield, N.J., assignors to Merck & Co., Inc., Rahway, N.J., a corporation of New Jersey
No Drawing. Original application Sept. 12, 1958, Ser. No. 760,562, now Patent No. 3,094,523, dated June 18, 1963. Divided and this application July 16, 1962, Ser. No. 210,184
3 Claims. (Cl. 260—397.47)

This invention is concerned generally with steroid compounds and with novel processes of preparing the same. More particularly, it relates to 6α,16α-dialkyl-11-oxygenated steroids of the pregnane series unsaturated in ring A and to a novel process and intermediates produced in preparing these compounds.

This is a division of co-pending application, Ser. No. 760,562, filed Sept. 12, 1958, now United States Patent No. 3,094,523.

These 6α,16α-dialkyl-11-oxygenated steroid compounds possess extremely high anti-inflammatory activity, and are especially effective for the treatment of arthritis and related diseases since they can be administered for their cortisone-like action in extremely low dosage thereby minimizing undesired side effects.

In preparing these active compounds, the starting material utilized is 16α-alkyl-5,6-dihalo-3β,17α,21-trihydroxy-20-pregnanone 21-acylate which may be represented graphically as follows:

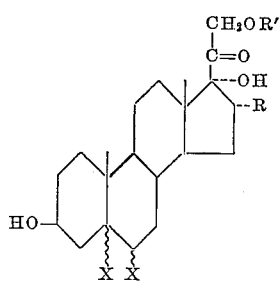

wherein R is alkyl, R' is acyl and X is halogen. The above 16α-alkyl-5,6-dihalo-3β,17α,21-trihydroxy-20-pregnanone 21-acylate is reacted with chromous halide to form 16α-alkyl-3β,17α,21-trihydroxy-5-pregnen-20-one 21-acylate which may be indicated graphically as follows:

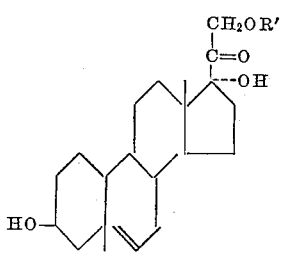

wherein R and R' are as above.
Reaction of the 16α-alkyl-3β,17α,21-trihydroxy-5-pregnen-20-one 21-acylate with para-toluenesulfonyl halide results in the formation of 16α-alkyl-3β,17α,21-trihydroxy-5-pregnen-20-one 3-tosylate 21-acylate which has the following structural formula:

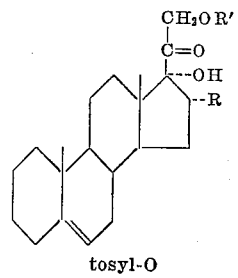

wherein R and R' are as above.
The 16α-alkyl-3β,17α,21-trihydroxy-5-pregnen-20 - one 3-tosylate 21- acylate is reacted with methyl ethyl ketone and potassium acetate to form 16α-alkyl-3,5-cyclo-6β,17α,21-trihydroxy-20-pregnanone 21 - acylate which may be represented as follows:

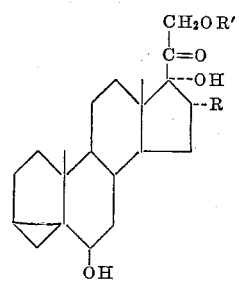

16α-alkyl-3,5-cyclo-6β,17α,21-trihydroxy-20 - pregnanone 21-acylate is reacted with an oxidizing agent such as chromium trioxide to form 16α-alkyl-3,5-cyclo-17α,21-dihydroxy-6,20-pregnanedione 21-acylate which has the following structural formula:

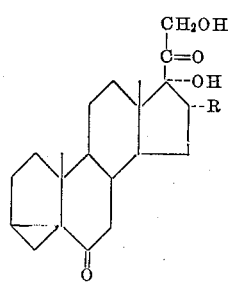

wherein R and R' are as above.
The 16α-alkyll-3,5-cyclo-17α,21-dihydroxy - 6,20 - pregnanedione 21-acylate is hydrolyzed with sodium methoxide to form the 21-alcohol, namely, 16α-alkyl-3,5-cyclo-17α,21-dihydroxy-6,20-pregnanedione which may be represented as follows:

The 16α - alkyl - 3,5 - cyclo - 17α,21 - dihydroxy-6,20-pregnanedione is reacted with formaldehyde to form 16α- alkyl - 3,5 - cyclo - 17α,20,20,21 - bismethylenedioxy - 6-pregnanone which has the structural formula:

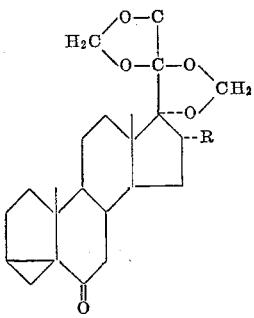

wherein R is as above.

Treatment of the above 16α-alkyl-3,5-cyclo-17α,20,20,21-bismethylenedioxy-6-pregnanone with an alkyl magnesium halide yields a mixture of isomers of 6ε,16α-dialkyl-3,5 - cyclo - 6ε - hydroxy - 17α,20,20,21 - bismethylenedioxypregnane which may be represented as follows:

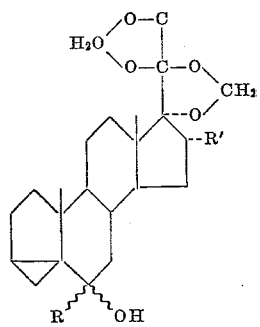

The 6ε,16α - dialkyl - 3,5 - cyclo - 6ε - hydroxy-17α,20,20,21-bismethylenedioxypregnane is reacted with acid to remove the hydroxyl group in the 6-position to form 6,16α - dialkyl - 3β - hydroxy - 17α,20,20,21 - bismethylenedioxy-5-pregnen 3β-acylate which may be represented as follows:

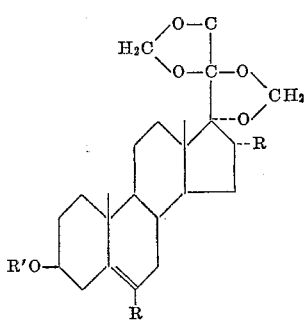

wherein R and R' are as above.

The 6,16α - dialkyl - 3β - hydroxy - 17α,20,20,21 - bismethylenedioxy-5-pregnene 3β-acylate is hydrolyzed to 6,16α - dialkyl - 3β - hydroxy - 17α,20,20,21 - bismethylenedioxy-5-pregnene which can be represented as follows:

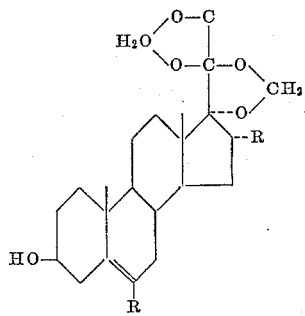

wherein R is as above.

The 6,16α - dialkyl - 3β - hydroxy - 17α,20,20,21 - bismethylenedioxy-5-pregnene can be reacted with cyclohexanone and aluminum isopropoxide to form 6α,16α-dialkyl - 17α,20,20,21 - bismethylenedioxy - 4 - pregnen-3-one which has the following structural formula:

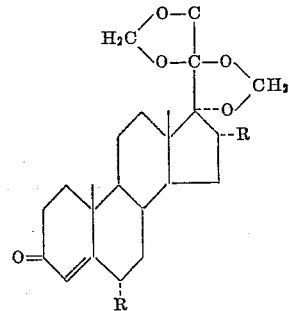

wherein R is as above.

Treatment of the above 6α,16α-dialkyl-17α,20,20,21-bismethylenedioxy-4-pregnen-3-one with acid results in the formation of 6α,16α - dialkyl - 17α,21 - dihydroxy-4-pregnene-3,20-dione which may be indicated as follows:

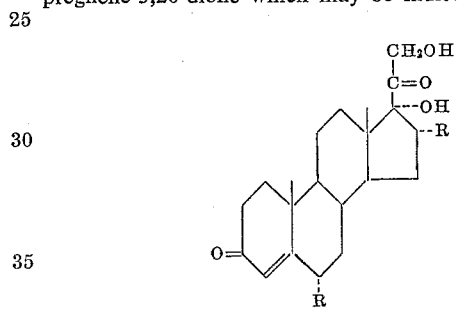

wherein R is as above.

The 6α,16α - dialkyl - 17α,21 - dihydroxy - 4-pregnene-3,20-dione can be subjected to the action of an oxygenating enzyme produced by a strain of *Curvularia lunata* to from 6α,16α - dialkyl-11β,17α,21-trihydroxyl-4-pregnene-3,20-dione, a compound which possesses high anti-inflammatory activity and is especially effective in the treatment of arthritis and related diseases. The organism *Curvularia lunata* can be obtained from known sources such as the Northern Regional Research Laboratory (No. 2434), Peoria, Ill. or they may be isolated from natural sources, such as soil, by known methods.

The 6α,16α-dialkyl-11β,17α,21 - trihydroxy-4-pregnene obtained can be treated with acetic anhydride to form the 21-acylate derivative which is purified by recrystallization from benzene petroleum ether to form substantialy pure 6α,16α-dialkyl-11β,17α,21 - trihydroxy-4-pregnene-3,20-dione 21-acylate.

The hydroxy group in the 11β-position can be converted to 11-keto by oxidation of 6α,16α-dialkyl-11β,17α,21-trihydroxy - 4 - pregnene-3,20-dione 21-acylate with chromium trioxide in the presence of pyridine to form 6α,16α-dialkyl-17α,21-dihydroxy - 4 - pregnene-3,11,20-trione 21-acylate. The 6α,16α-dialkyl - 11β,17α,21 - trihydroxy - 4 - pregnene-3,20-dione 21-acylate esters thereof and 6α,16α-dialkyl-17α,21-dihydroxy - 4 - pregnene-3,11,20-trione and 21-acylate esters thereof have been found to possess extremely effective anti-inflammatory activity in the treatment of arthritis and related diseases.

Alternatively, 6α,16α-dialkyl-17α,21-dihydroxy-4-pregnene-3,20-dione can be subjected to the action of an oxygenating enzyme produced by a strain of *Rhizopus nigricans* to introduce a 11α-hydroxy group into the steroid thus forming 6α,16α-dialkyl-11α,17α,21-trihydroxy-4-pregnene-3,20-dione. The *Rhizopus nigricans* organism can be obtained from known sources such as the American Type Culture Collection No. 6227b, Washington, D.C., or they may be isolated from natural sources, such as soil, by known methods. Oxidation of the 11α-hydroxy group to 11-keto can be accomplished by a reaction with chromous acid to form 6α,16α-dialkyl-17α,21-dihydroxy-4-pregnene-3,11,20-trione. The 3,20-positions of the ring can be protected by the introduction of semicarbazone groups. This procedure involves reacting 6α,16α-dialkyl-17α,21-dihydroxy - 4 - pregnene-3,11,20-trione with semicarbazide halide to form 3,20-disemicarbazone of 6α,16α-dialkyl-17α,21-dihydroxy-4-pregnene-3,11,20-trione. This latter compound is then reacted with sodium borohydride in tetrahydrofuran to introduce the hydroxy in the 11β-position. The 3,20-bis-semicarbazone groups can be removed by treatment with pyruvic acid to form 6α,16α-dialkyl-11β,17α,21-trihydroxy-4-pregnene-3,20-dione.

The 6α,16α-dialkyl - 11β,17α,21-trihydroxy-4-pregnene-3,20-dione or 6α,16α-alkyl-dialkyl - 17α,21-dihydroxy-4-pregnene-3,11,20-trione can be reacted with selenium dioxide to introduce the double bond in ring A at the 1-position thereby forming 6α,16α-dialkyl-11β,17α,21-trihydroxy-1,4-pregnadiene - 3,20-dione- or 6α,16α-dialkyl-17α,21-dihydroxy-1,4-pregnadiene-3,11,20-trione.

Alternatively, the double bond can be introduced into a 6α,16α-dialkyl-17α,21-dihydroxy-4-pregnene-3,20-dione employing selenium dioxide thus forming 6α,16α-dialkyl-17α,21-dihydroxy-1,4 - pregnadiene-3,20-dione 21-acylate. The 11β-hydroxy-group can be introduced into the latter compound employing *Curvularia lunata* to form 6α,16α-dialkyl-11β,17α,21-trihydroxy - 1,4 - pregnadiene-3,20-dione. It is also possible to introduce the 11α-hydroxy into the 6α,16α-dialkyl-17α,21-dihydroxy - 1,4 - pregnadiene-3,20-dione 21-acylate, oxidizing the 11α-hydroxy to the 11-keto compound, protecting the 3 and 20-position with semicarbazone groups and introducing the 11β-hydroxy. The 3,20-semicarbazone can be removed leaving 6α,16α-dialkyl-11β,17α,21-trihydroxy - 1,4 - pregnadiene-3,20-dione.

The 6α,16α-dialkyl - 11β,17α,21 - trihydroxy-1,4-pregnadiene-3,20-dione and 21-acylate esters and the 6α,16α-dialkyl-17α,21-dihydroxy-1,4-pregnadiene-3,20-dione and 21-acylate esters obtained by these procedures possess extremely high anti-inflammatory activity and are especially effective in the treatment of arthritis.

The 16α-alkyl-5,6-dihalo-3β,17α,21-trihydroxy-20-pregnanone 21-acylate used as starting materials in this process are conveniently prepared starting with the known 3-acyloxy-5,16-pregnadien-20-one in accordance with the following procedure:

3-acyloxy-5,16-pregnadien-20-one is reacted with alkyl magnesium halide thereby forming 16α-alkyl-3β-hydroxy-5-pregnen-20-one which is reacted with an acyl anhydride in the presence of pyridine to form 3β-acyloxy-16α-alkyl-5-pregnen-20-one. The latter compound is reacted with halogen to form 3β-acyloxy-16α-alkyl-5,6-dihalo-20-pregnanone, which is then reacted with a dialkyl oxalate. The resulting alkyl ester of 16α-alkyl-5,6-dihalo-3β-hydroxy-20-oxo - 21-pregnane-glyoxylic acid is hydrolyzed with an alkali metal hydroxide to form 16α-alkyl-5,6-dihalo-3β-hydroxy-20-oxo-21-pregnane-glyoxylic acid. The latter compound is reacted with nitrobenzene sulfonic acid and an acyl anhydride to form 3β,23-diacyloxy-16α-alkyl-5,6-dihalo-21-normethyl - 17(20),22 - choladieno-24(20)-lactone. Reaction of the latter compound with a peracid yields 3β,23-diacyloxy-16α-alkyl - 5,6-dihalo-21-normethyl-17(20)-oxido - 22 - cholano-24(20)-lactone which is reacted with base to yield 16α-alkyl-5,6-dihalo-3β,17α-dihydroxy-20-pregnanone. The latter compound is reacted with a halogenating agent to form 16α-alkyl-5,6,21-trihalo-3β,17α-dihydroxy-20-pregnanone. Reaction of the latter compound with an acylating agent results in the formation of 16α-alkyl-5,6-dihalo - 3β,17α,21-trihydroxy-3,20-pregnanedione 21-acylate.

In all of the previously described reactions, R has been designated as alkyl, and is intended to include the lower alkyl groups such as methyl, ethyl and propyl or aryl alkyl group. R' has been indicated as acyloxy. The acyloxy groups that may be employed in these reactions include lower hydrocarbon carbonyloxy esters such as benzoate, lower alkanoates such as acetoxy, and propionoxy, X is halogen and is intended to include bromo and chloro. It will be evident to those skilled in the art that other groups may be substituted for those recited here and these definitions are intended only as some indication of the operable class of compounds.

The following experimental part illustrates in detail some of the compounds which constitute this invention and methods for their production. However, this invention is not to be construed as limited thereby in spirit or in scope which it will be apparent to those skilled in the art that many modifications in materials and methods may be made without departing from the invention.

EXAMPLE 1

*Preparation of 3β,17α,21-trihydroxy-16α-methyl-5-pregnen-20-one 21-acetate*

A 3 ml. aqueous acetone solution of chromous chloride, prepared by reduction of chromic chloride with amalgamated zinc, is added to .13 g. of 5,6-dichloro-3β,17α,21 - trihydroxy-16α-methyl-20-pregnanone 21-acetate (prepared as described herein below). The mixture is refluxed for five minutes under nitrogen, then cooled and diluted with 5 ml. of water. The precipitate which separated from solution, is filtered and recrystallized from acetone to yield 80 mg. of 3β,17α,21-trihydroxy-16α-methyl-5-pregnen-20-one 21-acetate which melted at 185–188° C.

$\lambda_{max.}^{CHCl_3}$ 5.74 (sh), 5.79μ

*Analysis.*—Calculated for $C_{24}H_{36}O_5$ (404.53): C, 71.26; H, 8.97. Found: C, 70.95; H, 9.28.

The 5,6-dichloro-3β,17α,21-trihydroxy-16α-methyl-20-pregnanone 21-acetate used as a starting material in this example is prepared as follows:

A solution of 10 g. of methyl iodide in 40 ml. of ether is added to 1.73 g. of magnesium in 50 ml. of ether. To the resulting 90 ml. of ethereal solution of methyl magnesium iodide, maintained under a nitrogen atmosphere is added 50 ml. of ether followed by the addition of .64 g. of cuprous chloride. The mixture is stirred vigorously for 1.5 hours at 20° C. and then refluxed for ½ hour. At the end of this time the yellow cuprous chloride is converted to a fine black insoluble powder. A solution of 16.4 g. of 3-acetoxy-5,16-pregnadiene-20-one in 500 ml. of absolute ether, is added over a period of 1 hour. The mixture is then refluxed for 6 hours with stirring. The methyl magnesium iodide complex and excess methyl magnesium iodide is decomposed by the careful addition of 150 ml. of 10% sulfuric acid. The mixture is then filtered through diatomaceous earth and transferred to a separatory funnel. The aqueous acetic layer is separated and back extracted with 200 ml. of ethyl acetate. The ethyl acetate is combined with the ether layer and washed successively with water, 5% sodium sulfite solution, water, 10% sodium bicarbonate solution and finally with water. The organic solution is dried and concentrated in vacuo until crystallization begins. The ethyl acetate solution is then distilled at atmospheric pressure until crystallization of 3β-hydroxy-16α-methyl-5-pregnene-20-one begins. The solution is cooled to 10° C. and filtered. Wt. 10.89 g. M.P. 182–188° C. Recrystallization from ethyl acetate raises the melting point to 189–191° C.

A mixture of 50.0 g. of 3β-hydroxy-16α-methyl-5-pregnene-20-one in 200 ml. of acetic anhydride and 200 ml. of pyridine is allowed to stand for 18 hours at 20° C. The mixture is concentrated to dryness and the residue dissolved in benzene. The benzene solution is washed with 25% sulfuric acid, saturated sodium bicarbonate solution and water. The benzene solution is dried and concentrated to dryness. Petroleum ether is added to induce crystallization. The 3β-acetaxy-16α-methyl-5- pregnen-20-one is filtered and dried. Wt. 50.3 g. M.P. 181–185° C.

Chlorine gas is slowly bubbled into 40 ml. of benzene containing .21 ml. of pyridine. Simultaneously, a solution of 6.0 g. of 3β-acetoxy-16α-methyl-5-pregnen-20-one in .40 ml. of benzene containing .21 ml. of pyridine is added to the chlorine-benzene solution. The rate of addition of the steroid solution is adjusted so that a slight excess of chlorine is present. The addition of the steroid requires 25 minutes. The reaction mixture is poured into 5% sodium thiosulfate solution to destroy the excess chlorine. The benzene solution is washed with 5% hydrochloric acid, sodium bicarbonate solution and water. The benzene solution is then dried and concentrated to dryness. The residue is dissolved in hot acetone, treated with charcoal and filtered. The filtrate is evaporated on a steam bath until crystallization starts. The mixture is cooled and filtered to yield 3β-acetoxy-5,6-dichloro-16α-methyl-20-pregnanone which melts at 195°–198° C.

Sodium methoxide is prepared by adding 35 ml. of methanol to 3.18 g. of clean sodium in a 250 ml. round-bottom flask. To the mixture is added 100 ml. of dry toluene and the mixture is distilled slowly until the boiling point of the distillate is 110° C. Diethyl oxalate (24.6 grams) is then added slowly to the cooled sodium methoxide solution maintaining the temperature between 20–25° C. Then 11.8 grams of 3β-acetoxy-5,6-dichloro-16α-methyl-20-pregnanone is added and the yellow solution stirred for 18 hours.

The mixture is poured slowly with stirring into 250 ml. of ether-petroleum ether (1:1) to precipitate the sodium salt of the ethyl ester of 5,6-dichloro-3β-hydroxy-16α-methyl-20-oxo 21-pregnaneglyoxylic acid which is collected by filtration. Ethanol (110 ml.) is then added to the sodium salt of the ethyl ester of 5,6-dichloro-3β-hydroxy-16α - methyl-20-oxo-21-pregnaneglyoxylic acid and the mixture acidified by addition of 2.5 N hydrochloric acid. To this mixture is added 250 ml. of water and 250 ml. of benzene and stirred for 10 minutes. The benzene layer is separated and washed with water until neutral. The benzene solution is dried and concentrated in vacuo to yield 16.3 g. of the ethyl ester of 5,6-dichloro-3β-hydroxy-16α-methyl-20-oxo-21-pregnaneglyoxylic acid U.V. $\lambda_{max}$. 2920, E% 135.

To 16.3 grams of the ethyl ester of 5,6-dichloro-3β-hydroxy-16α-methyl-20-oxo-21-pregnaneglyoxylic acid is added 250 ml. of methanol and then over a period of 20 minutes 250 ml. of .5 N sodium hydroxide is added. The mixture is stirred for 5 hours and then rapidly heated to 70° C. and held at 70° C. for five minutes. The clear solution is cooled rapidly to 25° C. and acidified with 2.5 N hydrochloric acid. The precipitate is collected and washed thoroughly with water. The crude 5,6-dichloro-3β-hydroxy - 16α - methyl-20-oxo-21-pregnaneglyoxylic acid is slurried with 100 ml. of acetonitrile, filtered and dried. Wt. 10.02 grams, M.P. 209–211° C. U.V. $\lambda_{max}$. 2910, E% 208.

Acetic anhydride (82 ml.) is added to 2.2 grams of 5,6-dichloro-3β-hydroxy-16α-methyl-20-oxo-21-pregnaneglyoxylic acid. To this suspension is added 300 mg. of dinitrobenzene sulfonic acid. The mixture is stirred for 2 hours and 300 mg. of potassium acetate is added and the solution concentrated in vacuo below 50° C. to dryness. The 3β,23-diacetoxy - 5,6 - dichloro-16α-methyl-21-normethyl-17(20),22-choladieno-24(20)-lactone is dissolved in 250 ml. of benzene and washed successively with two portions of 100 ml. of cold 2.5 sodium hydroxide and two portions of 100 cc. of water. The benzene solution is dried and concentrated to dryness to yield an orange-red oil which yields light tan crystals on trituration with ethanol. The 3β,23-diacetoxy-5,6-dichloro-16α-methyl-21-normethyl - 17(20),22-choladieno-24(20)-lactone weighs 8.6 g. U.V. $\lambda_{max}$. 2990, E% 423.

A solution of 8.61 grams of 3β,23-diacetoxy-5,6-dichloro-16α-methyl-21-normethyl-17(20),22 - choladieno-24(20)-lactone is dissolved in 82 ml. of .55 M perbenzoic acid in benzene. The solution is allowed to stand at room temperature for 5 days. The benzene solution is then washed successively with 5% sodium bisulfite solution, saturated sodium bicarbonate solution, and finally with saturated sodium chloride solution. The benzene solution is dried and concentrated to dryness to yield an oil which crystallizes on addition of 50 ml. of petroleum ether. Filtration yields 8.68 grams of 3β,23 - diacetoxy-5,6-dichloro-16α-methyl-21-normethyl - 17(20) - oxido-22-choleno-24(20)-lactone U.V. $\lambda_{max}$. 2280, E% 194.

A solution of .5 g. of 3β,23-diacetoxy-5,6-dichloro-16α-methyl-21-normethyl-17(20)-oxido - 22 - choleno-24(20)-lactone in 6 ml. of tetrahydrofuran and 20 ml. of 2.5 N sodium hydroxide is stirred for 20 hours at room temperature. The tetrahydrofuran layer is separated and water added to precipitate 5,6-dichloro-3β,17α-dihydroxy-16α-methyl-20-pregnanone. This product is filtered and the cake dissolved in ethyl acetate. The ethyl acetate solution is washed with sodium bicarbonate solution and water. Concentration of the ethyl acetate yields 300 mg. of 5,6-dichloro - 3β,17α - dihydroxy-16α-methyl-20-pregnanone. M.P. 203–209° C. (dec.). Recrystallization from methanol raises the melting point to 215–216° C. dec.

To a solution of .207 gram of 5,6-dichloro-3β,17α-dihydroxy-16α-methyl-20-pregnanone in 5 ml. of chloroform containing .01 ml. of methanol is added over a period of 1 hour, 1.56 ml. of .352 M bromine in chloroform solution. The chloroform solution is poured into ether and washed successively with saturated sodium bicarbonate solution and water. The chloroform-ether solution is dried and concentrated to yield an oil which crystallizes on standing. This crystalline material, namely 21-bromo - 5,6 - dichloro-3β,17α-dihydroxy-16α-methyl-20-pregnanone is recrystallized from benzene-petroleum ether. M.P. 190–194° C.

A mixture of .305 gram of 21-bromo-5,6-dichloro-3β,17α-dihydroxy-16α-methyl - 20 - pregnanone, .294 gram of potassium acetate, .233 gram of potassium iodide, .001 ml. of acetic acid in 6 ml. of acetone is refluxed with stirring for 18 hours. The mixture is diluted with water and filtered. The cake is dissolved in ethyl acetate and the ethyl acetate solution is washed with water, dried and concentrated to dryness. This crystalline residue of 5,6-dichloro-3β,17α,21 - trihydroxy - 16α - methyl - 20 - pregnanone 21-acetate is the starting material employed in this example.

EXAMPLE 2

*Preparation of 3β,17α,21-trihydroxy-16α-methyl-5-pregnen-20-one-3-tosylate 21-acetate*

To a solution of 50 mg. of 3β,17α,21-trihydroxy-16α-methyl-5-pregnen-20-one 21-acetate in 5 ml. of pyridine is added 35 mg. of p-toluenesulfonylchloride. The mixture is allowed to stand for sixteen hours at about 20° C. The mixture is then diluted with water and extracted with chloroform. The chloroform extract is washed with four 3 ml. portions of water. The chloroform solution is dried and concentrated to dryness. The residue is dissolved in acetone and petroleum ether is added until the solution is turbid. After standing for about fifteen hours, 3β,17α,21-trihydroxy-16α-methyl-5-pregnen-20-one 3-tosylate 21-acetate crystallizes from solution. The mixture is filtered, washed with petroleum ether and dried. M.P. 176–178° C.

EXAMPLE 3.

*Preparation of 3,5-cyclo-6β,16α,21-trihydroxy-16α-methyl-20-pregnanone 21-acetate*

A mixture of 16.6 mg. of 3β,17α,21-trihydroxy-16α-methyl-5-pregnen-20-one 3-tosylate 21-acetate, 1 ml. of methyl ethyl ketone, 21 mg. of potassium acetate and .2 ml. of water is refluxed for 18 hours. The methyl ethyl ketone is evaporated in a stream of nitrogen. The residue is triturated with water and dissolved in a mixture of benzene-ethyl acetate. The organic layer is washed with saturated sodium bicarbonate solution and water, dried and concentrated to dryness to yield an oil.

$$\lambda_{max.}^{CHCl_3} \ 2.75-290\mu, \ 5.74\mu, \ (sh) \ 5.78\mu)$$

The residual oil is crystallized from acetate to yield pure acetone solvate of 3,5 - cyclo - 6β,17α,21-trihydroxy-16α-methyl-20-pregnanone 21-acetate $$(\lambda_{max.}^{KBr} \ 2.85-2.97\mu, \ 5.74\mu, \ (sh), \ 5.81\mu, \ 5.91\mu)$$

*Analysis.*—Calculated for $C_{24}H_{36}O_5 \cdot C_3H_6O$: C, 70.01; H, 9.15. Found: C, 69.80; H, 8.84.

EXAMPLE 4

*Preparation of 3,5-cyclo-17α,21-dihydroxy-16α-methyl-6,20-pregnanedione 21-acetate*

A solution of 50 mg. of 3,5-cyclo-6β,17α,21-trihydroxy-16α-methyl-20-pregnanone 21-acetate in .5 ml. of pyridine is prepared. A solution of 50 mg. of chromium trioxide in .5 ml. of pyridine is then added and the mixture allowed to stand for about fifteen hours at 20° C. The reaction mixture is diluted with hot benzene and filtered through diatomaceous earth. The benzene filtrate is washed successively with 1 N hydrochloric acid, water, sodium bicarbonate and water. The benzene solution is dried, filtered and concentrated to dryness. The residue is crystallized from ethyl acetate-petroleum ether to yield 3,5-cyclo-17α,21-dihydroxy - 16α - methyl - 6,20 - pregnanedione 21-acetate.

$$\lambda_{max.}^{CHCl_3} \ 5.74\mu, \ (sh), \ 5.79\mu, \ 5.95\mu$$

EXAMPLE 5

*Preparation of 3,5-cyclo-17α,21-dihydroxy-16α-methyl-6,20-pregnanedione*

To a solution of 363 mg. of 3,5-cyclo-17α,21-dihydroxy-16α-methyl-6,20-pregnanedione 21-acetate in 20 ml. of purified methanol is added a .42 ml. solution of 2.16 N sodium methoxide in methanol. The solution is stirred for 8 minutes and then is made slightly acid with acetic acid. The mixture is diluted with water and the precipitate is collected by filtration. The hydrolyzed product 3,5-cyclo.- 17α,21 - dihydroxy - 16α - methyl - 6,20-pregnanedione is washed thoroughly with water and is employed directly in the next reaction.

EXAMPLE 6

*Preparation of 3,5-cyclo-16α-methyl-17α,20,20,21-bismethylenedioxy-6-pregnanone*

To a mixture of .280 g. of 3,5-cyclo-17α, 21-dihydroxy-16α-methyl-6,20-pregnanedione in 11 ml. of chloroform is added a solution of 2.8 ml. of concentrated hydrochloric acid and low methanol 37% formaldehyde, premixed at 0° C. The two phase system is stirred at 20° C. under nitrogen for 24 hours. The chloroform layer is then separated and the aqueous layer is extracted twice with 25 ml. portions of chloroform. The chloroform extracts are combined and washed with saturated sodium bicarbonate solution and water. The chloroform solution is dried and concentrated to dryness. The residue is flushed twice with 20 ml. portions of methanol. The residue is then dissolved in benzene and chromatographed on Florosil. The column is eluted successively with 1%, 3%, 5% and 7.5% acetone in n-hexane. The crystalline fractions from the 5% acetone cuts, which give a negative blue tetrazolium test are combined and recrystallized from methanol to yield substantially pure 3,5-cyclo-16α-methyl-17α,20,20,21-bismethylenedioxy-6-pregnanone.

EXAMPLE 7

*Preparation of a mixture of isomers of 3,5-cyclo-6ε-hydroxy - 6ε,16α - dimethyl - 17α,20,20,21 - bismethylenedioxypregnane*

To a solution of 150 mg. of 3,5-cyclo-16α-methyl-17α, 20,20,21-bismethylenedioxy-6-pregnanone in 25 ml. of ether is added dropwise a solution of 1 ml. of 3 M methyl magnesium in ether. The mixture is refluxed for two hours, cooled and excess Grignard reagent is decomposed with a saturated ammonium chloride solution. The ether layer is separated and the aqueous layer is extracted with chloroform. The organic extracts are combined, washed with water, dried and concentrated. The residue which is probably a mixture of isomers of 3,5-cyclo-6ε-hydroxy - 6ε,16α - dimethyl-17α,20,20,21-bismethylenedioxypregnane is used in the next step without purification.

EXAMPLE 8

*Preparation of 3β-hydroxy-6,16α-dimethyl-17α,20,20,21-bismethylenedioxy-5-pregnen-3β-acetate*

A solution of 150 mg. of a mixture of isomers of 3,5-cyclo - 6ε - hydroxy - 6ε,16α - dimethyl-17α,20,20,21-bismethylenedioxypregnane in 2 ml. of 10% sulfuric acid in acetic acid is stirred for about fifteen hours at 20° C. The mixture is diluted with ice water and the solids collected by filtration. The cake is washed thoroughly with water and dried. The product, is 3β-hydroxy-6,16α-dimethyl - 17α,20,20,21 - bismethylenedioxy - 5-pregnen-3β-acetate.

EXAMPLE 9

*Preparation of 3β-hydroxy-6,16α-dimethyl-17α,20,20,21-bismethylenedioxy-5-pregnene*

The 3β-hydroxy - 6,16α - dimethyl - 17α,20,20,21 - bismethylenedioxy-5-pregnen-3β-acetate obtained in the previous Example 8 is hydrolyzed by dissolving it in 5 ml. of methanol, adding 50 mg. of potassium carbonate and refluxing on the steam bath for one hour. The mixture is cooled, diluted with 1 ml. of water and the methanol evaporated in a stream of nitrogen. The precipitate is filtered, washed thoroughly with water and recrystallized from aqueous methanol to give 3β-hydroxy-6-16α-dimethyl-17α,20,20,21-bismethylenedioxy-5-pregnene.

EXAMPLE 10

*Preparation of 6α,16α-dimethyl-17α,20,20,21-bismethylenedioxy-4-pregnen-3-one*

To a solution of 5 ml. of toluene and 100 mg. of 6,16α-dimethyl-17α,20,20,21-bismethylenedioxy-5-pregnene is added .25 ml. of cyclohexanone and 125 mg. of redistilled aluminum isopropoxide. The mixture is heated under reflux for 45 minutes. A .25 ml. solution of potassium sodium tartrate is added and the mixture is steam distilled to remove the toluene and cyclohexanone. After cooling, the aqueous suspension is extracted with chloroform. Concentration of the chloroform in vacuo yields an oil which is triturated with petroleum ether to remove traces of cyclohexanone. The residue is dried thoroughly in vacuo and is crystallized from benzene-heptane to give 6α,16α - dimethyl - 17α,20,20,21 - bismethylenedioxy - 4-pregnen-3-one.

EXAMPLE 11

*Preparation of 17α,21-dihydroxy-6α,16α-dimethyl-4-pregnene-3,20-dione*

A solution of 70 mg. 6α,16α-dimethyl-17α,20,20,21-bismethylenedioxy-4-pregnen-3-one in 7 ml. of 50% acetic acid is heated on a steam bath under nitrogen for 8 hours. The solvents are concentrated to dryness in vacuo. The residue is dissolved in chloroform and washed with a saturated sodium bicarbonate solution. The chloroform solution is filtered and concentrated to a small volume. The chloroform solution is then streaked on paper strips. The paper is dipped in a formamide methanol solution (1:2) and air dried at room temperature for 15 minutes. The sheets are developed using benzene as the mobile phase. The sheets are air dried and the major U.V. and blue tetrazolium positive section is eluded with ethyl acetate. The ethyl acetate solution is washed with water, dried and concentrated to a small volume. Petroleum ether is added to precipitate the 17α,21-dihydroxy-6α,16α-dimethyl-4-pregnene-3,20-dione.

EXAMPLE 12

Preparation of 11β,17α,21-trihydroxy-6α,16α-dimethyl-4-pregnene-3,20-dione

A medium is prepared having the following composition:

Glucose _____g__ 20
An enzymatic lactoalbumen digest (Edamin)____g__ 20
Corn steep liquor _____ml__ 5
Water to make 1 liter.

This medium is distributed in 50 ml. portions in appropriate vessels. The pH of the medium is adjusted to 6.5 with 1 M potassium hydroxide and sterilized at 120° C. for 12 minutes.

The medium in each vessel is then inoculated with an aqueous suspension of spores of the strain of Curvularia lunata (Northern Regional Research Laboratory No. 2434) and the regulated media are maintained at an incubation temperature of 28° C. for 48 hours on a rotary shaking machine.

Ten mg. of 17α,21-dihydroxy-6α,16α-dimethyl-4-pregnene-3,20-dione prepared as described in Example 11 is added to each vessel from a dimethylformamide solution (100 mg./ml.). The incubation is carried out for an additional 24 hours under conditions identical to the growth phase. The whole broth is then extracted three times with equal volumes of ethyl acetate, the extracts combined, and finally concentrated. The 11β,17α,21-trihydroxy-6α,16α-dimethyl-4-pregnene-3,20-dione is filtered off.

The 11β,17α,21-trihydroxy-6α,16α - dimethyl - 4 - pregnene-3,20-dione is treated with acetic anhydride and pyridine to give the 21-acetyl derivative, which is purified by recrystallization from benzene-petroleum ether to give substantially pure 11β,17α,21-trihydroxy-6α,16α-dimethyl-4-pregnene-3,20-dione 21-acetate.

EXAMPLE 13

Preparation of 17α,21-dihydroxy-6α,16α-dimethyl-4-pregnene-3,11,20-trione

A solution of 200 mg. of 11β,17α,21-trihydroxy-6α,16α-dimethyl-4-pregnene-3,20-dione 21-acetate in 2 ml. of pyridine is added to the complex formed by the addition of 200 mg. of chromium trioxide to 2 ml. of pyridine. The mixture is swirled until thoroughly mixed and then allowed to stand at room temperature for about 16 hours. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-ether to give 17α,21-dihydroxy-6α,16α-dimethyl-4-pregnene-3,11,20-trione 21-acetate.

Twenty-five milligrams of 17α,21-dihydroxy-6α,16α-dimethyl-4-pregnene-3,11,20-trione 21-acetate is dissolved in 1 ml. of methanol and .29 ml. of .21 N sodium methoxide in methanol is added and the solution is stirred at 20° C. under nitrogen for 7 minutes. The reaction mixture is acidified with acetic acid and diluted with water. After evaporation, of the methanol, in vacuo, the precipitate is filtered and dried. The product is crystallized from ethyl acetate-ether to give 17α,21-dihydroxy-6α,16α-dimethyl-4-pregnene-3,11,20-trione.

EXAMPLE 14

Preparation of 11α,17α,21-trihydroxy-6α,16α-dimethyl-4-pregnene-3,20-dione

A medium is prepared having the following composition:
Glucose _____g__ 20
An enzymatic lactoalbumen digest (Edamin) ____g__ 20
Corn steep liquor _____ml__ 5
Water to make 1 liter.

This medium is distributed in 50 ml. portions in appropriate vessels. The pH of the medium is adjusted to 6.5 with 1 M of potassium hydroxide and sterilized at 120° C. for 12 minutes.

The medium in each vessel is then inoculated with a heavy aqueous suspension of spores of a strain of Rhizopus nigricans (American Type Culture Collection No. 6227b) and the inoculated media are maintained at an incubation of 28° C. for 48 hours on a rotary shaking machine.

Ten mg. of 17α,21-dihydroxy-6α,16α-dimethyl-4-pregnene-3,20-dione prepared as described in Example 11 is added to each vessel from a dimethylformamide solution (100 mg./ml.). The incubation is carried out for an additional 24 hours under conditions identical to the growth phase. The whole broth is then extracted 3 times with equal volumes of ethyl acetate, the extracts combined, and finally concentrated. The 11α,17α,21-trihydroxy-6α,16α-dimethyl-4-pregnene-3,20-dione is filtered off.

The 11α,17α,21-trihydroxy-6α,16α - dimethyl - 4 - pregnene-3,20-dione is treated with acetic anhydride and pyridine to give the 21-acetyl derivative, which is purified by recrystallization from benzene-petroleum ether to give substantially pure 11α,17α,21-trihydroxy-6α,16α-dimethyl-4-pregnene-3,20-dione 21-acetate.

EXAMPLE 15

Preparation of 17α,21-dihydroxy-6α,16α-dimethyl-4-pregnene-3,11,20-trione

In accordance with the chromium trioxide oxidation procedure described in Example 13, but using 11α,17α,21-trihydroxy-6α,16α-dimethyl-4-pregnene-3,20-dione 21-acetate as the starting material in place of 11β,17α,21-trihydroxy-6α,16α-dimethyl-4-pregnene-3,20-dione 21 - acetate, there is obtained 17α,21-dihydroxy-6α,16α - dimethyl - 4 - pregnene-3,11,20-trione.

EXAMPLE 16

Preparation of 3,20-disemicarbazone of 17α,21-trihydroxy-6α,16α-dimethyl-4-pregnene-3,11,20-trione To a stirred solution of 250 mg. of 17α,21-dihydroxy-6α,16α-dimethyl-4-pregnene-3,11,20-trione in 6.3 ml. of methanol and 3 ml. of water is added a slurry of 340 mg. of semicarbazide hydrochloride and 190 mg. of sodium bicarbonate in 1 ml. of water. The stirred mixture is refluxed under nitrogen for 4 hours. It is then cooled to 20° C. and 30 ml. of 50% saturated aqueous sodium chloride is added. After 3 hours at 0° C., the precipitate of the 3,20-disemicarbazone of 17α,21-dihydroxy-6α,16α-dimethyl-4-pregnene-3,11,20-trione is filtered, washed with water, until free of chloride ion and dried in air.

EXAMPLE 17

Preparation of 3,20-disemicarbazone of 11β,17α,21-trihydroxy-6α,16α-dimethyl-4-pregnene-3,20-dione To a stirred solution of 300 mg. of the 3,20-disemicarbazone of 17α,21 - dihydroxy-6α,16α-dimethyl-4-pregnene-3,11,20-trione in 15 ml. of tetrahydrofuran and 10 ml. of water is added 100 mg. of sodium borohydride. The stirred suspension is refluxed two hours and then cooled to 15° C. Aqueous acetic acid (3 ml. of 30%) is added cautiously and most of the tetrahydrofuran is removed in vacuo. The product crystallizes on addition of 10 ml. of 50% saturated aqueous sodium chloride and aged at 0° C. The product, 3,20-disemicarbazone of 11β,17α,21 - trihydroxy - 6α,16α - dimethyl - 4-pregnene-3,20-dione is filtered, washed with water and dried in air.

EXAMPLE 18

*Preparation of 11β,17α,21-trihydroxy-6α,16α-dimethyl-4-pregnene-3,20-dione*

To a solution of 250 mg. of the 3,20-disemicarbazone of 11β,17α,21 - trihydroxy - 6α,16α-dimethyl-4-pregnene-3,20-dione in 2.5 ml. of acetic acid is added .5 ml. of water and 0.25 ml. of pyruvic acid. The solution is maintained at 25° C. for 18 hours. Water (30 ml.) is added and the mixture is extracted thoroughly with chloroform. The chloroform extract is dried over sodium sulfate and taken to dryness. The residue is crystallized from ethyl acetate to give pure 11β,17α,21-trihydroxy-6α,16α-dimethyl-4-pregnene-3,20-dione.

EXAMPLE 19

*Preparation of 17α,21-dihydroxy-6α,16α-dimethyl-1,4-pregnadiene-3,10-dione 21-acetate*

17α,21 - dihydroxy - 6α,16α-dimethyl-4-pregnene-3,20-dione (prepared as described in Example 11) is treated with acetic anhydride and pyridine to give the 21-acetyl derivative, which is purified by recrystallization from benzene-petroleum ether to give substantially pure 17α,21-dihydroxy-6α,16α-dimethyl-4-pregnene-3,20-dione 21-acetate.

To 50 mg. of 17α,21-dihydroxy-6α,16α-dimethyl-4-pregnene-3,20-dione 21-acetate thus obtained in 2.5 ml. of t-butanol and 0.1 ml. of acetic acid is added 30 mg. of selenium dioxide. The mixture is refluxed under nitrogen for 24 hours, 25 mg. of selenium dioxide is added and the mixture refluxed an additional 24 hours. The mixture is filtered and the filtrate taken to dryness. The residue is taken up in ethyl acetate and washed successively with aqueous sodium bicarbonate, ammonium sulfide, dilute ammonia water, water, dilute hydrochloric acid, water and is dried over magnesium sulfate. It is then treated with activated charcoal and concentrated to dryness. Crystallization of the residue from acetone-ether gives pure 17α,21 - dihydroxy-6α,16α-dimethyl-1,4-pregnadiene-3,20-dione 21-acetate.

EXAMPLE 20

*Preparation of 11β,17α,21-trihydroxy-6α,16α-dimethyl-1,4-pregnadiene-3,20-dione*

The fermentation procedure of Example 12 is repeated but using 17α,21 - dihydroxy-6α,16α-dimethyl-1,4-pregnadiene-3,20-dione 21-acetate in place of 17α,21-dihydroxy-6α,16α-dimethyl-4-pregnene-3,20-dione and 11β,17α,21-trihydroxy-6α,16α-dimethyl-1,4-pregnadiene-3,20-dione is recovered.

EXAMPLE 21

*Preparation of 11α,17α,21-trihydroxy-6α,16α-dimethyl-1,4-pregnadiene-3,20-dione*

Ten mg. of 17α,21-trihydroxy-6α,16α-dimethyl-1,4-pregnadiene-3,20-dione 21-acetate (obtained as in Example 19) is subjected to the action of an oxygenating enzyme produced by a strain of *Rhizopus nigricans* (American Type Culture Collection No. 6227b) and 11α,17α,21-trihydroxy - 6α,16α - dimethyl-1,4-pregnadiene-3,20-dione is formed. This microbial procedure is fully described in Example 14.

EXAMPLE 22

*Preparation of 17α,21-dihydroxy-6α,16α-dimethyl-1,4-pregnadiene-3,11,20-trione*

The 11α,17α,21-trihydroxy-6α,16α-dimethyl-1,4-pregnadiene-3,20-dione (prepared as in Example 21) is oxidized with chromium trioxide to form 17α,21-dihydroxy-6α,16α-dimethyl-1,4-pregnadiene-3,11,20-trione. This procedure is fully described in Example 13.

EXAMPLE 23

*Preparation of 3,20-disemicarbazone of 17α,21-dihydroxy-6α,16α-dimethyl-1,4-pregnadiene-3,11,20-trione*

To a stirred solution of 125 mg. of 17α,21-dihydroxy-6α,16α-dimethyl-1,4-pregnadiene-3,11,20-trione (obtained as in Example 22) in 3.1 ml. of methanol and 3 ml. of water is added a slurry of 170 mg. of semicarbazide hydrochloride and 90 mg. of sodium bicarbonate in .5 ml. of water. The stirred mixture is refluxed under nitrogen for four hours. It is then cooled to 20° C. and 25 ml. of 50% saturated aqueous sodium chloride is added. After 3 hours at 0° C. the precipitate of the 3,20-disemicarbazone of 17α,21-dihydroxy-6α,16α-dimethyl - 1,4 - pregnadiene-3,11,20-trione is filtered, washed with water, until free of chloride ion and dried in air.

EXAMPLE 24

*Preparation of 3,20-disemicarbazone of 11β,17α,21-trihydroxy-6α,16α-dimethyl-1,4-pregnadiene-3,20-dione*

To a stirred solution of 150 mg. of the 3,20-disemicarbazone of 17a,21-dihydroxy-6α,16α-dimethyl-1,4-pregnadiene-3,11,20-trione in 7.5 ml. of tetrahydrofuran and 5 ml. of water is added 100 mg. of sodium borohydride. The stirred suspension is refluxed three hours and then cooled to 15° C. Aqueous acetic acid (1.5 ml. of 30%) is added cautiously and most of the tetrahydrofuran is removed in vacuo. The product crystallizes on addition of 10 ml. of 50% saturated aqueous sodium chloride and aged at 0° C. The product, 3,20-disemicarbazone of 11β,17α,21-trihydroxy-6α,16α-dimethyl-1,4 - pregnadiene-3,20 dione is filtered, washed with water and dried in air.

EXAMPLE 25

*Preparation of 11β,17α,21-trihydroxy-6α,16α-dimethyl-1,4-pregnadiene-3,20-dione*

To a solution of 125 mg. of the 3,20-disemicarbazone of 11β,17α,21-trihydroxy-6α,16α-dimethyl-1,4 - pregnadiene-3,20-dione in 1.2 ml. of acetic acid is added .25 ml. of water and 0.12 ml. of pyruvic acid. The solution is maintained at 25° C. for 18 hours (water 10 ml.) is added and the mixture is extracted thoroughly with chloroform. The chloroform extract is dried over sodium sulfate and taken to dryness. The residue is crystallized from ethyl acetate to give pure 11β,17α,21-trihydroxy-6α,16α-dimethyl - 1,4-pregnadiene-3,20-dione.

Various changes and modifications may be made in the present invention, certain preferred embodiments of which are herein disclosed, without departing from the scope thereof; to the extent that these changes and modifications are within the scope of the appended claims they are to be considered a part of this invention.

We claim:

1. 6α,16α-di-lower alkyl-17α,21-dihydroxy-4 - pregnen-3,20-dione.

2. 17α,21-dihydroxy-6α,16α-dimethyl-4-pregnen - 3,20-dione.

3. A compound of the formula:

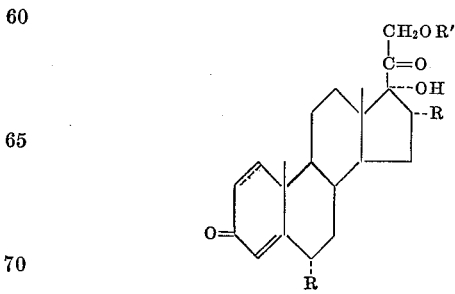

wherein R is lower alkyl and R' is selected from the group consisting of hydrogen and lower alkanoyl and the dotted line between carbon 1 and 2 indicates that a double bond may be present in this position.

References Cited

UNITED STATES PATENTS

| | | | |
|---|---|---|---|
| 2,805,230 | 9/1957 | Stork et al. | 260—397.4 |
| 3,116,303 | 12/1963 | Taub et al. | 260—397.45 |
| 3,147,290 | 9/1964 | Spero | 260—397.46 |
| 3,176,032 | 3/1965 | Ringold et al. | 260—397.47 |
| 3,201,429 | 8/1965 | Djerassi et al. | 260—397.47 |

OTHER REFERENCES

Arth et al.: 80 JACS 3/60 (June 1958).
Spero et al.: 78 JACS 6213 (1956).
Market et al.: 64 JACS 1280 (1942).

LEWIS GOTTS, *Primary Examiner.*

ELBERT L. ROBERTS, *Examiner.*

T. M. MESHBESHER, *Assistant Examiner.*